United States Patent Office 3,261,796
Patented July 19, 1966

3,261,796
AQUEOUS DISPERSION OF VINYL ADDITION POLYMER CONTAINING AMINOESTER RADICALS
John A. Simms, Wilmington, Del., assignor to E. I. du Pont de Nemours and Company, Wilmington, Del., a corporation of Delaware
No Drawing. Filed July 1, 1964, Ser. No. 379,718
5 Claims. (Cl. 260—29.6)

This application is a continuation-in-part of application Serial No. 258,605 filed February 14, 1963, and now abandoned.

This invention relates to a novel polymer latex which is especially useful in adhesive and coating applications.

The term "latex" herein designates an aqueous dispersion of a water-insoluble polymer, the polymer being present in the form of very fine particles.

It is known that polymeric latices and solutions for laminating and coating articles made from wood, fabric, plastics, metals, etc., can be made from many different polymers. Latex adhesives and coating compositions are preferred over the solution-type compositions by many laminators, painters and manufacturers of coated articles for reasons well known in the art. For example, the use of water instead of a volatile organic solvent as the liquid phase not only reduces material and equipment costs but also reduces such application problems as toxicity, fire hazard, noxious odors, difficulty of clean-up, damage to solvent-sensitive substrates, limited solubility of high molecular weight polymers, and excessive viscosity at high polymer solids content.

Carboxylic polymers are an important class of polymers used by the adhesive and coating composition industries.

"Carboxylic polymer" herein designates a substantially water-insoluble interpolymer containing pendant carboxylic acid groups (—COOH), or salts thereof (e.g., —COONH$_4$. Such an interpolymer is the product of reacting at least one monomer containing both a carboxylic acid group (or equivalent source of carboxyl groups) and polymerizable olefinic unsaturation with at least one other monomer copolymerizable therewith.

It is frequently preferable to make adhesives and coating compositions from carboxylic polymers in latex form rather than solution form for the reasons listed above and because these polymers are so efficiently produced in latex form by emulsion polymerization.

Although many useful coating and laminating compositions for fabrics, paper and man-made leather have been made from carboxylic polymer latices, the dry-film adhesion of these compositions to various substrates is not entirely satisfactory for many applications. Another limitation is the serious loss in adhesion and abrasion resistance of the dried film when the coated or laminated article is subjected to contact with water. This problem can be minimized by using much less than the normal amount of surfactant in the latex, but only at a sacrifice in latex stability.

It is therefore an object of this invention to provide a new latex having adhesive and coating utility. A particular object is to achieve better dry-film adhesion to various substrates than is obtainable with prior art carboxylic polymer latices.

A further object is to change the chemical structure of a carboxylic polymer in latex form so as to render it more useful in adhesive and coating applications.

Still another object is to provide a latex of good stability which, when applied to a substrate as a coating or adhesive layer and dried, adheres well to the substrate both in the dry state and in the water-wet state.

Other objects will become apparent from the description of the invention which follows.

Expressed broadly, the novel product of this invention is a latex of a vinyl addition polymer having attached to the carbon-carbon chain monovalent aminoester radicals of the following formula:

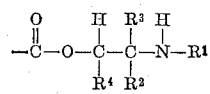

In Formula A, $R^1$ can be H, benzyl, or a $C_1$ to $C_{10}$ alkyl radical. $R^2$ and $R^3$ can be selected individually from the group consisting of H, benzyl, aryl and $C_1$ to $C_{10}$ alkyl radicals. $R^4$ can be H or a $C_1$ to $C_5$ alkyl radical.

$R^1$ should be H or a $C_1$ to $C_4$ alkyl radical when maximum dry-film adhesion is desired. Alkyl radicals above $C_3$ should be unbranched on the alpha carbon atom unless dry-film adhesion is of no great concern.

The expression "aminoester polymer latex" herein designates the novel product described above.

A useful liquid for making the aminoester polymer latex, broadly speaking, comprises reacting a carboxylic polymer (as defined previously) in latex form with an aziridine compound (as defined below). This reaction may be referred to as the "imination reaction" and the aziridine compound is sometimes referred to as an alkylene imine.

"Aziridine compound" herein designates a compound of the following formula:

FORMULA B

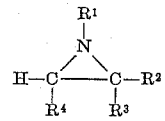

wherein $R^1$, $R^2$, $R^3$ and $R^4$ are as defined in Formula A.

The carboxylic polymer latex can be prepared by known methods of emulsion polymerization wherein a carboxylic acid monomer is reacted in an aqueous memium with a copolymerizable monomer that is not a carboxylic acid, for example, an alkyl ester of acrylic or methacrylic acid in which the alkyl group contains 1 to 12 carbon atoms, a conjugated diene having 4–10 carbon atoms, acrylonitrile, styrene, alkyl-substituted styrene, vinyl chloride, vinyl acetate, or a blend of two or more such monomers. A non-acid monomer component containing a substantial proportion (over 30%) of an alkyl methacrylate is especially useful when the product is to be used in adherence with a polyvinyl fluoride layer or in an application requiring good resistance to extended outdoor exposure.

It is usually best to use either methacrylic acid, acrylic acid or mixtures thereof as the monomer containing a carboxylic group for preparing the carboxylic polymer. Also useful, however, are other olefinically-unsaturated carboxylic acids possessing one or more olefinic carbon-to-carbon double bonds and one or more carboxyl groups. Preferably, the carboxylic acid should contain at least one activated olefinic carbon-to-carbon double bond of a type which readily functions in an addition polymerization. That is, it should contain either (1) a double bond in the alpha-beta position with respect to a carboxyl group (—CH=CH—COOH), or (2) a double bond attached to a terminal methylene grouping $$(CH_2=C<)$$

The following acid monomers exemplify members of the number (1) group: crotonic acid, angelic acid, hydrosorbic acid, cinnamic acid, m-chlorocinnamic acid, p-chlorocinnamic acid, alpha-cyano cinnamic acid, ubellic acid, and other monoolefinic monocarboxylic acids; sorbic acid, alpha-methyl sorbic acid, alpha-ethyl sorbic acid, alpha-chloro sorbic acid, alpha-methyl-gamma benzal crotonic acid, beta(2-butenyl)acrylic acid, 2,4-heptadieneoic acid, 2,4-pentadienoic acid, 2,4,6-octatrienoic acid, 1-carboxyl-1-ethyl-4-phenyl butadiene-1,3, 2,6-dimethyl decatriene-(2,6,8)-oic-10, alpha-beta isopropylidene propionic acid, alpha-vinyl cinnamic acid, alpha-isopropenyl-furfural acetic acid, alpha-isopropenyl-cinnamenyl acrylic acid, and other polyolefinic monocarboxylic acids; hydromuconic acid, glutaconic acid, maleic acid, fumaric acid, and other monoolefinic polycarboxylic acids; 3-carboxy-pentadiene-(2,4-)oic-1, muconic acid, and other polyolefinic polycarboxylic acids.

The following acid monomers exemplify members of the number (2) group: acrylic acid, alpha-chloro acrylic acid, methacrylic acid, ethacrylic acid, alpha-isopropylidene acrylic acid, alpha-styryl acrylic acid (2-carboxyl-4-phenyl butadiene-1,3), beta-vinyl acrylic acid (1-carboxy butadiene-1,3), alpha-vinyl acrylic acid, beta-acryloxy propionic acid, itaconic acid, and others. It is preferred to use a monoolefinic monocarboxylic acid having its olefinic double bond in the alpha-beta position with respect to the carboxyl group and containing a terminal methylene group.

The carboxyl groups can also be introduced into the essential interpolymer from a carboxyl-supplying reagent such as maleic anhydride or monosodium oxalate by the method disclosed in U.S. Patent 2,662,874 (e.g., in column 3, line 34 and column 4, line 8), or from a reagent containing groups hydrolyzable to carboxyl groups by the method disclosed in U.S. Patent 2,710,292.

Typical of the known methods of making a carboxylic polymer latex useful in the practice of this invention are those described in U.S. Patents 2,395,017; 2,724,707; 2,787,603; 2,868,752; 2,868,754; 2,918,391 and 3,032,521, the disclosures of which are incorporated herein by reference. Especially pertinent is the method described in U.S. 2,724,707, column 5, line 21 to column 6, line 60.

The emulsion used in preparing the carboxylic polymer latex is composed of the mixture of monomers, suitable emulsification and suspension agents (surfactants) buffering agents for pH control and a free radical catalyst; for example, potassium persulfate, a peroxide such as hydrogen peroxide, a diazo compound such as azobisisobutyroamidine hydrochloride or a redox type such as persulfate-sulfite, or mixtures of such catalysts. Polymerization can be carried out in the presence of a free radical catalyst in a closed vessel in an inert atmosphere and under autogeneous pressure or under artificially induced pressure or in an open vessel under reflux at atmospheric pressure. The temperatures of the polymerization can be varied from 0° C. or lower to 100° C. or higher, preferably from 20° C. to 90° C., depending to a large degree upon the activity of the monomers and catalyst used and the molecular weight desired in the polymeric product.

The carboxylic acid monomer is preferably added to the emulsion reaction mixture in an amount sufficient to result in a carboxylic polymer into which about 0.01 to 2% amino nitrogen (by weight of polymer) can be introduced during the subsequent imination reaction. Generally, the carboxylic polymer should have an acid equivalent of about 0.001 to 3.0, preferably 0.05–2.3, and even more preferably about 0.1 to 1.0 milliequivalents per gram (dry basis). In the interest of obtaining a substantially water-insoluble carboxylic polymer and a stable latex product, it is usually best to add less than 10%, preferably less than 6%, acid monomer based on the total weight of monomer in the reaction mixture.

For purposes of this invention a carboxylic polymer is utilized having 0.5–10% and preferably 2–6% by weight of monomer units containing carboxyl groups and the imination reaction is conducted to convert 10–70% of these carboxyl groups to aminoester groups while insuring, in any event, that the iminated polymer contains at least 0.1% by weight of carboxylic monomer units. Thus the iminated polymer product is characterized by having attached to the carbon-carbon chain monovalent radicals of the formulas

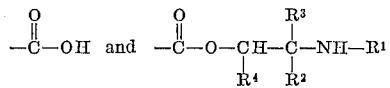

The acid content of the carboxylic polymer can be determined by separating the polymer from the aqueous phase, dissolving it in a solvent and titrating the resulting polymer solution with alcoholic KOH to a phenolphthalein end-point. The acid content can also be determined by complete chemical analysis of the polymer.

The carboxylic polymer is produced in any molecular weight that fits the intended use of the final product, usually above about 100,000 and frequently above about a million.

The novel aminoester polymer latex is prepared by reacting the carboxylic polymer in latex form with an aziridine compound (alkylene imine) of Formula B above. Ethylenimine (Formula C) and 1,2-propylenimine (Formula D) are particularly preferred aziridines because of their relatively low cost and plentiful supply and because they tend to give the best adhesion characteristics in most final products.

FORMULA C 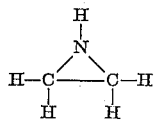  FORMULA D 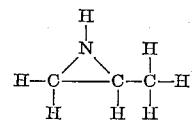

The aziridine compound is added to the carboxylic polymer latex in an amount equal to about 10 to 200% of the theoretical amount required to esterify all the pendant carboxyl groups of the carboxylic polymer. When the arizidine compound is added as an aqueous solution, the solution should be prepared a very short time before the solution is mixed with the latex; this is to avoid any undue hydrolysis of the aziridine compound prior to the imination reaction. The stability of the aminoester polymer latex that results from the imination reaction (esterification) tends to be enhanced by the presence of unreacted (non-esterified) carboxyl groups. The amount of unreacted carboxyl groups present in the product can be increased by adding proportionately less aziridine.

In a typical procedure for carrying out the imination reaction, the aziridine compound is mixed with the carboxylic poylmer latex, containing about 0.5 to 10% anionic surfactant based on polymer weight, in a reaction vessel at, or near, room temperature (e.g., about 18–30° C.) and atmospheric pressure, stirring is continued under the same conditions for about 10 to 60 minutes, the mixture is heated at about 40 to 80° C. until the reaction is completed (e.g., about ½ hour at the higher temperatures to about 12 hours at the lower temperatures) and finally the reaction product is cooled to room temperature. The upper temperature limit is determined largely by how much heat the particularl latex will withstand without coagulating. The entire reaction can be carried out at room temperature, but heating is generally preferred because of the resulting shorter reaction time.

The product of the imination reaction described above is the novel aminoester polymer latex. As shown previously in Formula A, the aminoester polymer contains pendant amino groups. The amino nitrogen content of the aminoester polymer should be about 0.01 to 2.0% by weight, preferably about 0.1 to 1.5%.

It is essential that the aqueous dispersion of this invention contain anionic surfactant in order to be useful for the purposes disclosed. The anionic surfactant must be present in an amount of about 0.05–10% based on polymer solids. It is also essential that for use in coating compositions the aqueous dispersions of this invention have a pH of at least about 8 and preferably about 8–10. This pH can be attained by addition of a suitable base to the imination reaction product mixture. Ammonia is preferred and convenient to use for this purpose but amines and alkaline materials such as KOH and NaOH can be used. When the dispersion is to be used in a paint composition a pH of 9–10 is preferred and is obtained by addition of ammonia to the iminated polymer latex containing anionic surfactant.

Various additives or modifiers known to be useful in latex adhesives and coating compositions can be added to the aminoester polymer latex, for example, pigments, other polymers in finely divided form, fillers, anti-freeze agents, plasticizers, stabilizers, odor controlling agents, fungicides, and flow controlling agents (e.g., thickeners).

The process described above is useful for the production of aminoester polymer latices in which the polymer has a molecular weight of any desired value, but a polymer molecular weight of at least about 50,000 is essential for the purposes of this invention and a molecular weight of at least 100,000 is preferred. Much greater utility is provided with the higher molecular weight polymer latices than is obtainable with these polymers in solution form because the viscosity does not become excessive in the latices as it does in the solutions. In fact, polymers can be used without difficulty in the latex which are extremely difficult to dissolve in ordinary volatile organic solvents. Greater utility is also provided in the lower molecular weight polymer latices than with solutions of these polymers because a higher polymer solids content can be present in the latices without an undue increase in viscosity.

Since the aziridines are known to be very susceptible to hydrolysis, it is quite unexpected that these compounds can be reacted so effectively with carboxylic polymers in aqueous media. It was expected that these imines would hydrolyze before any useful amount of aminoester units could be formed. Also, in view of the known sensitivity of latices, it is surprising that the imination reaction can be carried out without the latex being coagulated or otherwise destroyed.

The reaction method is simple, economical and substantially free of health and fire hazards. Moreover, since many of the preferred carboxylic polymers are most effectively produced by emulsion polymerization, and since the imination reaction of this method is performed within the resulting latex, certain costly steps that would be necessary in a solvent-medium reaction are absent from this method (e.g., separation, drying and dissolving the carboxylic polymer).

Novel aminoester polymer latices are obtainable in accordance with this invention which are useful as interior or exterior coating compositions and adhesives having a high degree of adhesion to a wide variety of materials, for example, wood (bare, primed or coated with an old paint film), plastics, fabrics, paper, man-made leather, papered, painted or bare plaster walls and ceilings, metals, fabrics, masonry and cement-asbestos sheet materials. The adhesion to most materials is far superior to that obtained with the corresponding carboxylic polymer latex.

Before coating or laminating metal articles with the novel latex, it is usually best to passivate the metal first, for example, in a suitable chromate, phosphate or anodizing bath. Some of the most adhesion-resistant plastics can be strongly laminated to themselves and to other materials with this latex; for example, polyvinyl fluoride film can be laminated to itself and to most conventional construction materials.

In a typical lamination process, a coat of the latex is applied to one or both of the surfaces to be bonded, the coat is dried in a heat zone, the surfaces are integrally united under heat and pressure, and then the bonded assembly is cooled to room temperature. During the pressing cycle the aminoester polymer is heated enough to render it fluid and tacky. When laminating porous materials, such as wood or paper, the adhesive layer can be dried after the layers are united.

The invention provides an adhesive and coating composition characterized not only by improved dry-film adhesion and the other advantages mentioned above, but also by the known cost and application advantages of latices over polymer solutions as previously discussed. Moreover, house paints and latex compositions for coating man-made leather, paper and other articles are obtainable in accordance with this invention which have a unique combination of good latex stability and good retention of adhesion and abrasion resistance of the dried film when an article coated therewith is exposed to water (e.g., by immersion or spraying). Surprisingly enough, the durability after water-soaking is obtainable even when a relatively large proportion of surfactant is present in the latex, for example, about 5 to 10% based on the polymer solids content of the latex. The latex product is also useful as a binder for nonwoven fabrics, as a coating for tire cord, as a printing ink (colorants are added) and wherever else that polymers in latex form are known to be useful.

While any of the water-soluble anionic surfactants ordinarily used in aqueous emulsion polymerization techniques can be used as the anionic surfactant, which is an essential component in the aqueous dispersion of this invention, sodium lauryl sulfate is preferred as providing iminated polymer particles of optimum size. Soluble alkali metal and ammonium salts of half esters of sulfuric acids with long chain fatty alcohols can also be used, as can water soluble polyalkylene oxide derivatives having an anionic group. Other anionic surfactants which can be used include alkyl aryl sulfonates, sulfated and sulfonated esters and ethers and alkyl sulfonates. Numerous additional species of anionic surfactants useful in this invention are listed in "Synthetic Detergents" by J. W. McCutcheon, published by MacNair-Dorland Company, New York, 1957.

The examples which follow are given for the purpose of illustrating the invention. All quantities shown are on a weight basis unless otherwise indicated. The water listed in the formulas is deionized water.

*Example 1*

An aminoester polymer latex having advantageous utility as an adhesive for laminating a wide variety of materials is prepared by first following Formula E to make a latex of a carboxylic polymer.

FORMULA E—CARBOXYLIC POLYMER LATEX

| | Parts by weight |
|---|---|
| Portion 1: | |
| Water | 405.0 |
| Anionic surfactant (30% aqueous solution of sodium lauryl sulfate) | 0.91 |
| Portion 2: | |
| Water | 18.0 |
| Potassium persulfate | 0.73 |
| Portion 3: | |
| Ethyl acrylate | 206.0 |
| Methyl methacrylate | 141.0 |
| Methacrylic acid | 14.5 |
| Portion 4: | |
| Water | 71.0 |
| Anionic surfactant (30% aqueous solution of sodium lauryl sulfate) | 6.3 |
| Portion 5: | |
| Water | 4.5 |
| Potassium persulfate | 0.4 |
| | 868.34 |

Each portion is premixed before it is added. Portion 1 is charged into a conventional polymerization vessel equipped with stirrer, thermometer, condenser and means to introduce nitrogen and reagents. The polymerization reaction to follow is carried out under nitrogen. Portion 1 is heated to 70° C., Portion 2 is added with stirring, and while keeping the contents of the vessel at 70 to 80° C., Portions 3 and 4 are added gradually and simultaneously over a period of 2 hours. Then Portion 5 is added, and the temperature of the mixture is kept at 70 to 80° C. for another 2 hours. After the resulting carboxylic polymer latex is cooled to 25° C., it is filtered through cheesecloth to remove any coarse coagulum that has formed.

The completed Formula E latex has a carboxylic polymer content of about 42%. The polymer is a 57:39:4 interpolymer of ethyl acrylate:methyl methacrylate:methacrylic acid having a molecular weight of over a million.

A reaction vessel equipped with stirrer, thermometer, condenser and addition funnel is charged with 100 parts of the Formula E carboxylic polymer latex and propylenimine is added as a 30% aqueous solution (freshly prepared) in an amount equal to about 110% of the theoretical amount required to esterify all the pendant carboxyl groups of the carboxyl polymer. The propylenimine (1,2-propylenimine or 2-methylaziridine) is added gradually over a period of 10 minutes while stirring at 25° C. Then the mixture is heated to 50° C. over a period of 30 minutes and the 50° C. temperature is maintained for an additional 30 minutes. After the resulting aminoester polymer latex is slowly cooled to 25° C. and the pH is adjusted to 9.5 with dilute ammonia, it is filtered through cheesecloth to remove any coarse coagulum that has formed. The latex has a viscosity of 9.4 centipoises at 24° C., a preferred viscosity for rapid application of adhesive films.

Analysis of the latex before and after the imination reaction shows that 53.3% of the pendant carboxyl groups have been converted to aminoester groups during the reaction. The completed latex has good storage stability.

The molecular weight of the polymer is over a million. The amino nitrogen content of the aminoester polymer is about 0.8%.

The utility of the aminoester polymer latex as a wood adhesive is demonstrated by first applying a ½ inch wide strip of the latex to a lightly sanded surface of a piece of 0.25 inch thick plywood in an amount equal to 0.2 gram of latex per linear inch. A similar piece of plywood is then clamped in superposed contact with the latex-coated surface under a pressure of about 5 p.s.i. and the assembly is heated in a 110° C. oven for one hour. To facilitate subsequent testing of adhesion, the adhesive film is applied to within about ½ inch of the end of the substrate. After cooling the laminate to 25° C. and removing the clamps, the bond strength is measured in a conventional manner on an Instron Tensile Tester by pulling the pieces of wood apart at 180° angles at a rate of 2 inches per minute. The bond strength is 1187 p.s.i. (pounds per square inch).

When the wood lamination and test procedure described above is repeated except the aminoester polymer latex is replaced with the Formula E carboxylic polymer latex, the bond strength is only 632 p.s.i. Thus, the imination reaction almost doubles the wood-to-wood bond strength obtainable with the latex.

The utility of the Example 1 aminoester polymer latex as an adhesive for laminating sheet aluminum to polyvinyl fluoride film is demonstrated by first applying a 10 mils thick ½ inch wide strip of the latex to a conventional dichromate passivated surface of a 25 mil thick aluminum sheet, and drying the latex layer in a heat zone. A surface of a 2 mil thick, biaxially oriented, titanium dioxide pigmented polyvinyl fluoride film is placed in contact with the dried latex layer, and the assembly is heated at 110° C. for 5 minutes between the platens of a press while under a pressure of about 500 p.s.i. After cooling the laminate to 25° C. and removing it from the press, the bond strength is measured by pulling the 2 plies apart at a rate of 2 inches per minute. A pull of over 5 pounds is required to remove the plastic film from the aluminum sheet. The bond is so strong that it is difficult to remove the plastic film without tearing it.

When the test described in the above paragraph is repeated except the aminoester polymer latex is replaced with the Formula E carboxylic polymer latex, a pull of only 2.9 pounds is required to remove the plastic film. The film is easily removed without being torn.

*Example 2*

Aminoester polymer latices useful for laminating and coating a wide variety of materials are prepared by individually substituting the aziridines listed in Table I for propylenimine in the imination reaction described in Example 1. The percentage of pendant carboxyl groups converted to aminoester groups during the imination reaction in each latex is shown in Table II as "percent conversion."

TABLE I

| Aziridine Compound: | Percent conversion |
|---|---|
| Ethylenimine (aziridine) | 43.2 |
| N-butylaziridine | 55.7 |
| 2,2-dimethylaziridine | 59.1 |
| 2-ethylaziridine | 53.4 |

*Example 3*

Aminoester polymer latices having wide utility in coating and laminating industries are produced by repeating the imination reaction of Example 1 except for individually substituting carboxylic polymers made from the *monomers* listed in Table II for the carboxylic polymer used in Example 1. The *ratio* of monomers used, which is also the ratio of polymerized units in the interpolymers, is shown, as well as the percent conversion (as described in Example 2).

TABLE II

| Monomers | Ratio | Percent Conversion |
|---|---|---|
| EA/MMA/AA | 57/39/4 | 48.0 |
| EA/MMA/MAA | 58/40/2 | 52.5 |
| EA/MMA/MAA | 56/38/6 | 54.2 |
| EA/MMA/IA | 57/39/4 | 54.8 |
| BMA/MAA | 96/4 | 41.0 |
| B/MMA/MAA | 36/60/4 | 52.0 |

In Table II, EA is ethyl acrylate, BMA is butyl methacrylate, B is butadiene, MMA is methyl methacrylate, AA is acrylic acid, MAA is methacrylic acid, and IA is itaconic acid.

*Example 4*

An aminoester polymer latex house paint adapted for use on the exterior siding and trim of houses having clapboard or other types of siding is prepared by first following Formula F to make a latex of a carboxylic polymer.

FORMULA F.—CARBOXYLIC POLYMER LATEX

Parts by weight

| | |
|---|---|
| Portion 1: Water | 455.0 |
| Portion 2: | |
|     Water | 380.0 |
|     Methyl Methacrylate | 346.5 |
|     2-ethylhexyl acrylate | 408.0 |
|     Methacrylic acid | 15.5 |
|     Anionic surfactant, 30% aqueous solution of sodium lauryl sulfate | 25.6 |
|     Sodium meta-bisulfite | 0.81 |
| Portion 3: Potassium persulfate, 10% aqueous solution | 16.94 |
| Portion 4: Same as Portion 3 | 4.18 |
| Portion 4: Nonionic surfactant, 50% aqueous solution of "Triton" X–100 (octyl phenyl polyglycol ether) | 92.4 |
| | 1744.93 |

Portion 1 is charged into a conventional polymerization reaction vessel equipped with stirrer, means to control temperature, and means to introduce nitrogen. The polymerization reaction to follow is carried out under nitrogen. Portion 2 is premixed to emulsify the acrylic monomers; 120 parts of this portion are added to the vessel with stirring and the resulting mixture is heated to 65° C. Portion 3 is then added with stirring, the temperature is raised to 74° C., a reaction mixture temperature of 74 to 78° C. is maintained for 5 minutes, and while continuing to maintain this temperature, the remainder of Portion 2 is added gradually over a period of 140 minutes. Portion 4 is added and the mixture kept at 74 to 78° C. for 90 minutes more. After cooling the resulting interpolymer latex to 25° C., Portion 5 is added with thorough stirring, stirring is continued for 15 minutes, then the latex is filtered through cheesecloth to remove any coarse coagulum that has formed.

The resulting latex has a polymer content of about 47%, the polymer being a 45:53:2 interpolymer of methyl methacrylate:2-ethylhexyl acrylate:methacrylic acid. The average diameter of the polymer particles is about 0.1 to 0.2 micron. The polymer has a molecular weight of over 500,000, a relative viscosity of about 1.20, a tensile strength of over 1000 p.s.i. at 0° F. and an elongation of over 180% at 0° F.

The carboxylic polymer is iminated by charging a reaction vessel equipped with stirrer, thermometer, nitrogen inlet, condenser and addition funnel with 1000 parts of the Formula F latex. The reaction to follow is carried out under nitrogen. Propylenimine (non-diluted) is added gradually with stirring at 26° C. in an amount sufficient to esterify 33% of the pendant carboxyl groups of the polymer; the amount actually added is equal to about 100% of the theoretical amount required to esterify all the pendant carboxyl groups. Then the mixture is heated to 58° C. over a period of 30 minutes and the 58° C. temperature is maintained for an additional 60 minutes.

After the resulting aminoester polymer latex is slowly cooled to 25° C. and the pH is adjusted to 9.5 with dilute ammonia, it is filtered through cheesecloth to remove any coarse coagulum that has formed. Analysis shows that 33% of the pendant carboxyl groups have been converted to aminoester groups during the reaction.

Pigment and various modifiers are added to the Formula F latex in the form of a premixed dispersion prepared according to Formula G.

FORMULA G.—PIGMENT DISPERSION

Parts by weight

| | |
|---|---|
| Portion 1: | |
|     Talc pigment extender | 10.93 |
|     Methyl cellulose, "Methocel" HG | 0.27 |
| Portion 2: Water | 12.21 |
| Portion 3: | |
|     Anti-foam agent, "Nopco" 1497V | 0.30 |
|     Potassium tripolyphosphate | 0.17 |
|     Ammonium hydroxide, 28% $NH_3$ | 0.23 |
|     Bodying agent, "Acrysol" A–3 | 0.51 |
|     Phenyl mercury oleate, 10% in mineral spirts | 3.24 |
|     Ethylene glycol | 2.59 |
| Portion 4: Titanium dioxide pigment | 35.68 |
| Portion 5: | |
|     Nonionic surfactant, "Tween" 40 | 0.10 |
|     Water | 6.03 |
|     Mica pigment extender | 10.93 |
| Portion 6: | |
|     Ammonium hydroxide, 28% $NH_3$ | 0.17 |
|     Anti-foam agent, "Nopco" 1497V | 0.13 |
|     Formula F latex | 8.50 |
| Portion 7: Formula F latex | 8.01 |
| | 100.00 |

In Formula G: "Methocel" HG has a viscosity of 3000 to 5000 centipoises at 20° C., measured on a 2% aqueous solution. "Nopco" 1497V is understood to be composed of 60% anionic sulfated saturated fatty acid, 8% free fatty acid, and 32% inert matter. "Acrysol" A–3 is a 25% aqueous solution of low molecular weight water-soluble polyacrylic acid. The titanium dioxide is an 82:18 blend of rutile and anatase types.

The 7 portions of Formula G are introduced into a mixing tank in the order shown and uniformly blended and dispersed in accordance with conventional procedure for making pigment dispersions for use in latex paints.

Next, a paint composition is prepared by uniformly blending the components shown in Formula H.

FORMULA H.—ACRYLIC LATEX HOUSE PAINT

Parts by weight

| | |
|---|---|
| Formula F latex | 459.0 |
| Formula G pigment dispersion | 656.7 |
| Bodying Agent, "Acrysol" ASE–60 | 5.3 |
| | 1121.0 |

"Acrysol" ASE–60 is a 28% aqueous solution of a water-soluble interpolymer of methyl methacrylate, ethyl acrylate, and acrylic acid, the latter making up about 35% of the polymer.

The resulting paint has a pigment volume concentration of about 30%, a pH of about 9, a density of about 11.2 pounds per gallon and a convenient brushing viscosity of about 74 Krebs units.

The clapboard siding on the exterior walls of a house is painted with one coat of the completed latex paint, using an ordinary paint brush. The house had been painted four years previously with a conventional oil-base primer and white topcoat. The old weathered paint film is scraped lightly to remove loose paint from cracked and blistered areas, and the bare areas are primed with a conventional oil-base exterior primer and allowed to dry prior to the latex paint application. The paint has excellent application properties on both the primed areas and the weathered film areas. The paint film is allowed to air dry and age under ordinary atmospheric conditions. The paint film on the house is examined at frequent intervals for a period of several months and is found to have excellent resistance to cracking and blistering and good retention of appearance in general.

Loose pieces of clapboard siding in the same condition as those on the house are painted and dried as described above. The painted pieces are immersed in water for several hours and then tested immediately for paint film adhesion and abrasion resistance by conventional methods. The paint film is found to be much more resistant to removal with pressure-sensitive adhesive tape and to damage by abrasion with a pencil eraser than a carboxylic polymer paint film deposited and tested in the same manner. The latter is deposited from a paint made as described in Example 4 except the imination reaction is omitted.

Considering the amount of surfactant present in the paint of Example 4 and the well known tendency of surfactant-stabilized latex paints to suffer serious reduction in adhesion and abrasion resistance when the painted article is soaked in water, the results obtained are indeed advantageous and unexpected.

*Example 5*

A shoe-upper material having a poromeric (porous polymeric) vapor permeable structure is prepared and surface-finished with an aminoester polymer latex in the following manner.

A poromeric material is produced in accordance with Example 6 of U.S. Patent 3,000,757. This material is comprised of a nonwoven fabric containing a porous elastomeric binder and surface coated with an adherent and durable layer of microporous elastomeric material.

Next, a carboxylic polymer latex is prepared in accordance with Example 3 of U.S. Patent 2,795,564 except 0.55 part (dry basis) of sodium lauryl sulfate (anionic surfactant) is added to the water before the monomers are added. The polymer solids content of the latex is adjusted to 42%. The polymer is a 37:61.5:1.5 interpolymer of methyl methacrylate:ethyl acrylate:methacrylic acid.

The carboxylic polymer is iminated by charging a reaction vessel equipped with stirrer, thermometer, condenser and addition funnel with 100 parts of the carboxylic polymer latex. Propylenimine is gradually added (as a freshly made 33% aqueous solution) with stirring at 25° C. in an amount sufficient to esterify 50% of the pendant carboxyl groups of the polymer. Then the mixture is heated to 58° C. over a period of 30 minutes and this temperature is maintained for an additional 30 minutes.

After the resulting aminoester polymer latex is slowly cooled to 25° C. and the pH is adjusted to 9.5 with dilute ammonia, it is filtered through cheesecloth to remove any coarse coagulum that has formed. Analysis shows that 50% of the pendant carboxyl groups have been converted to aminoester groups during the reaction. A brown coating composition is prepared from the latex in accordance with Formula I.

FORMULA I.—LATEX COATING COMPOSITION

| | Parts by weight |
|---|---|
| Black dye | 2.43 |
| Brown dye | 10.20 |
| Yellow dye | 1.70 |
| Titanium dioxide, 20% aqueous dispersion | 2.43 |
| Water | 58.94 |
| Nonionic surfactant, 10% aqueous solution | 0.05 |
| Aminoester polymer latex of this example | 23.80 |
| | 99.55 |

In Formula I: The 3 dyes are anthraquinone vat dyes in the form of 20% aqueous pastes. The yellow is C.I. 61725, the brown is C.I. 69015 and the black is a 50:50 blend of olive C.I. 69525 and navy blue C.I. 71200. C.I. designates Color Index number as given in "Colour Index," second edition, volume 3, copyright 1957 in the U.S. by the American Association of Textile Chemists and Colorants. The titanium dioxide is dry-ground water-dispersible anatase type. The surfactant is the condensation product of reacting 20 moles of ethylene oxide with 1 mole of a C–18 alcohol. The ingredients are added and mixed in the order listed in a conventional pigment-dispersion mixer.

The man-made leather material is coated on the microporous surface with a 0.2 mil (dry thickness) layer of the Formula I composition. The coating is done by spraying a first coat, briefly air drying, and spraying a second coat. Next, the colored aminoester coating is dried for 3 minutes in a 105° C. heat zone.

A 0.05 mil (dry thickness) coat of clear pyroxylin lacquer of a type commonly used in finishing leather products is applied by spraying over the Formula I coat. The pyroxylin lacquer has a pyroxylin content of about 5% and a solvent composed of a 70:30 blend of ethanol and toluene. The lacquer also contains about 30% of a plasticizer for pyroxylin (based on the weight of pyroxylin), the plasticizer being a 60:40 blend of tricresyl phosphate and castor oil.

After the pyroxylin coat is dried and the product cooled to room temperature, the coated surface of the shoe-upper material is embossed in a conventional manner with a fine grain pattern that simulates the appearance of leather grain. The pyroxylin coat facilitates embossing by preventing the surface from sticking to the hot engraved metal embossing roll.

The Formula I coating does not unduly reduce the vapor permeability of the product and it is surprisingly adherent and durable, not only when dry but after the product is soaked for 60 minutes in water. The water-soaked abrasion resistance is measured by wrapping a piece of the water-soaked product around a 1 inch diameter cylinder with the coated surface exposed and rubbing the coated surface against wet #10 cotton duck under a weight of 1 pound per linear inch. The length of each stroke of rubbing is 2 inches. It takes 200 such strokes to damage the coating.

A control sample made in accordance with Example 5 except the imination reaction is omitted takes only 40 strokes to damage the coating after the sample is soaked 60 minutes in water. Shoes made with uppers of the control sample material are much less resistant to damage of the finish than shoes made with uppers of the Example 5 product, for example, when overshoes or rubbers are worn after the shoes have become wet.

EXAMPLE 6

*Methyl methacrylate ethyl acrylate/acrylic acid (50/50/2)*

In a polymerization reaction vessel equipped with stirrer, thermometer, condenser and means to introduce nitrogen with reagents there was introduced a solution of 1.0 grams of sodium lauryl sulfate in 405 ml. of water. To this solution heated to 70° C. there was added with stirring a solution of 0.73 gram of potassium persulfate in 18.0 ml. of water. To the combined aqueous solution held at a temperature of 70 to 80° C. there was added gradually and simultaneously over a period of two hours (1) a mixture of 177 grams of methyl methacrylate, 177 grams of ethyl acrylate, and 7 grams of acrylic acid and (2) an added solution of 6.3 grams of sodium lauryl sulfate in 71.0 ml. of water. An additional quantity (0.4 gram in 4.5 ml. of water) of potassium persulfate solution was added while the temperature of the reaction mixture was kept at 70-80° C. for another two hours. Following this the carboxylic polymer latex was cooled to 25° C. and filtered through cheesecloth to remove coarse coagulum.

The resulting methyl methacrylate/ethyl acrylate/acrylic acid interpolymer (50/50/2) was charged into a reaction vessel equipped with stirrer, thermometer, condenser and addition tube and there was added at 25° C. over a period of 10 minutes of stirring 20 grams of a 30% aqueous solution (10% mole excess) of propyleneimine. The reaction mixture was then heated at 50° C. for a period of one hour after which it was cooled slowly to 25° C., adjusted to a pH of 9.5 with ammonia and thereafter filtered through cheesecloth. The solids content of the polymer dispersion was approximately 42%.

To the filtered dispersion there was added carnauba wax dispersed as a 10% emulsion with 2.3%/5.2%-Span 60/Tween 60 mixture to give 5% wax solids based on the total weight of polymer solids (Span 60/Tween 60—Atlas Powder Co.—Sorbitan monooleate polyoxyethylene/sorbitan monooleate mixture) and a "Geon" 126 latex (B. F. Goodrich Chemical Co.), ½% based on the polymer solids.

A one mil thick biaxially oriented polypropylene film, treated for adhereability by subjecting its surface to a substantially neutral flame as the film was passed over a drum maintained at 70° C. following the procedure of U.S. Patent 2,648,097 was passed at 50 feet per minute to a coating bath of an aqueous dispersion as described above. Excess was dried by passing through a coating tower held at a temperature of about 60° C. The dried film bearing about 4 grams per square meter of coating was wound into mill rolls and submitted to characterization tests. The film showed a heat seal strength of over 250 grams/inch when sealed at 130° C., using a pressure of 5 p.s.i. and a dwell time of 0.25 second. The films showed no loosening of coating when immersed for 16 hours in water at 45° C. The film showed a blocking grade of 2. The blocking test is conducted by stacking sheets of the coated film under a pressure of 1½ lb./sq. inch and placing the stack in an oven at 130° F. for 18 hours. The stored films are graded for blocking as follows: (1) No evidence of sheets sticking together, (2) sheets lightly cling together —can be separated without damage to the coating, (3) sheets cling together lightly—coating damaged on separation of sheets and (4) sheets stuck tightly together.

EXAMPLE 7

*Methyl methacrylate/2-ethylhexyl acrylate/acrylic acid (54/35/2)*

Substantially the same results were obtained in coating a film of biaxially oriented polypropylene with an aminoester polymer latex comprising methyl methacrylate/2 - ethylhexyl acrylate/acrylic acid interpolymer (65/35/2).

The outstanding properties of the iminated polymers of this invention permit its use in a wide variety of applications such as, for example, a polymeric lubricant for nylon tire cords, as a binder for filament nylon or sizing for synthetic fibers generally including polyesters, polyamides and acrylics, as a finish for natural leather and poromeric materials, as an adhesive for bonding polypropylene to itself as in polypropylene film packaging, as a hot melt adhesive, as a clear finish for wood, plastic and metal substrates and in many other applications.

I claim:
1. An aqueous dispersion suitable for use as a coating composition consisting essentially of a latex of a vinyl addition polymer having attached to the carbon-carbon chain monovalent radicals of the formulas

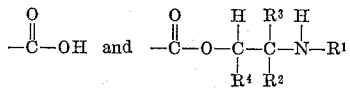

wherein $R^1$ is selected from the group consisting of hydrogen, benzyl and $C_1$ to $C_{10}$ alkyl radicals, $R^2$ and $R^3$ are selected individually from the group consisting of hydrogen, benzyl, aryl and $C_1$ to $C_{10}$ alkyl radicals, and $R^4$ is selected from the group consisting of hydrogen and $C_1$ to $C_5$ alkyl radicals; said latex having a pH of about 8–10 and containing about 0.05–10% anionic surfactant based on the weight of said polymer, and said polymer having an amino nitrogen content of about 0.01–2% by weight.

2. The coating composition of claim 1 containing coloring matter.

3. The composition of claim 1 in which the polymer has an amino nitrogen content of 0.1–1.5% by weight.

4. The composition of claim 1 in which $R^1$, $R^2$, $R^3$ and $R^4$ are hydrogen.

5. The composition of claim 1 in which $R^1$, $R^3$ and $R^4$ are hydrogen and $R^2$ is methyl.

References Cited by the Examiner
UNITED STATES PATENTS

| | | | |
|---|---|---|---|
| 2,787,603 | 4/1957 | Sanders | 260—29.6 |
| 2,933,416 | 4/1960 | Haakh et al. | 260—29.6 |
| 3,113,038 | 12/1963 | Lattarulo et al. | 117—140 |

MURRAY TILLMAN, *Primary Examiner.*

W. J. BRIGGS, *Assistant Examiner.*